UNITED STATES PATENT OFFICE.

JOSEPH THOMLINSON, OF PORTLAND, OREGON.

PROCESS OF HYDRATING LIME.

No. 798,755.　　　　Specification of Letters Patent.　　　　Patented Sept. 5, 1905.

Application filed May 23, 1905. Serial No. 261,894.

*To all whom it may concern:*

Be it known that I, JOSEPH THOMLINSON, a citizen of the United States, residing at Portland, in the county of Multnomah and State of Oregon, have invented a new and useful Process of Hydrating Lime, of which the following is a specification.

This invention is an improved process for hydrating lime, the object being to provide a cheap, simple, and efficient method whereby the superior article is produced; and with this object in view my invention consists in the steps hereinafter fully described, and set forth in the claims.

In carrying out my process I hydrate the lime in the usual way by any suitable machine or process; but before doing so I first boil the water, having added thereto sugar, molasses, or any cheap saccharin material, coarse or fine sand, paraffin, or petroleum. The mixture before described having been thoroughly commingled and dissolved, I add to the mass at boiling-point the burnt lime, either in lumps or ground, and in practice I have found the following proportions to be well adapted for carrying out the process. To every one hundred pounds of lime I use from three hundred to four hundred pounds of sand, with five per cent. of sugar, molasses, or other suitable form of saccharin material, one quart of paraffin or petroleum, together with ten gallons of water. After the lime and these materials have been mixed together the entire mass is dried and screened and is then ready for use. The product resulting from this process is a hydrated lime or cement suitable for use in masonry and can be used wherever a high grade of cement is desired.

For plastering I use the hydrated lime above described and mix with it hair or wood fiber, and in practice I prefer to use from fifty to sixty-five pounds of wood fiber or twenty to twenty-five pounds of hair and one-fourth of a ton of plaster-of-paris to each ton of the hydrated product before referred to.

Having thus fully described my invention, what I claim as new, and desire to secure by Letters Patent, is—

1. The herein-described process of hydrating lime, which consists in combining with the lime a mixture of water, sand, saccharin material, and a hydrocarbon combined in the proportions and manner set forth.

2. The herein-described process of hydrating lime, which consists in first providing a mixture of sand, sugar, petroleum and water, in the proportions set forth, introducing the lime to the said mixture at boiling-point, thoroughly commingling the entire mass, and then drying and screening the same.

3. As a new article of manufacture, a hydrated-lime product consisting of lime, sand, sugar, water, and petroleum, combined in the manner specified.

JOSEPH THOMLINSON.

Witnesses:
　HOWARD M. FAIRFOWL,
　STELLA R. ANGELL.